US012756034B2

(12) United States Patent
Krug et al.

(10) Patent No.: US 12,756,034 B2
(45) Date of Patent: Oct. 6, 2026

(54) THERMAL MANAGEMENT MODULE

(71) Applicant: HANON SYSTEMS EFP DEUTSCHLAND GMBH, Bad Homburg v.d. Höhe (DE)

(72) Inventors: Michael Krug, Gau-Bischofsheim (DE); Jan Hinrichs, Frierdrichsdorf (DE)

(73) Assignee: HANON SYSTEMS EFP DEUTSCHLAND GMBH, Bad Homburg V.D. Höhe (DE)

( * ) Notice: Subject to any disclaimer, the term of this patent is extended or adjusted under 35 U.S.C. 154(b) by 0 days.

(21) Appl. No.: 18/865,090

(22) PCT Filed: Sep. 27, 2023

(86) PCT No.: PCT/DE2023/200204
§ 371 (c)(1),
(2) Date: Nov. 12, 2024

(87) PCT Pub. No.: WO2024/222984
PCT Pub. Date: Oct. 31, 2024

(65) Prior Publication Data

US 2026/0163115 A1 Jun. 11, 2026

(30) Foreign Application Priority Data

Apr. 26, 2023 (DE) ........................ 102023203863.3

(51) Int. Cl.
*H01M 10/6568* (2014.01)
*B60L 50/64* (2019.01)
(Continued)

(52) U.S. Cl.
CPC ......... *H01M 10/6568* (2015.04); *B60L 50/64* (2019.02); *F16L 41/03* (2013.01);
(Continued)

(58) Field of Classification Search
CPC ........... B60K 11/02; B60K 2015/03223; F01P 11/029
See application file for complete search history.

(56) References Cited

U.S. PATENT DOCUMENTS 10,196,962 B2 * 2/2019 Kerkewitz ............. F01P 11/029
10,665,908 B2 5/2020 Krull et al.

FOREIGN PATENT DOCUMENTS

CN 115139736 A 10/2022
DE 102015119940 A1 5/2016
(Continued)

OTHER PUBLICATIONS

FR2848621a1, Machine Translation (Year: 2002).*

*Primary Examiner* — Daphne Barry
(74) *Attorney, Agent, or Firm* — Shumaker, Loop & Kendrick, LLP; James D. Miller

(57) ABSTRACT

A thermal management module for electric vehicles, which includes a reservoir and a manifold, wherein the thermal management module is composed of two half-shells, each having a manifold half-shell and a reservoir half-shell as a single piece, the two half-shells being joined together. The half-shells may be joined along a common joining seam arranged in one plane. The joining seam may be arranged vertically in an installed state of the thermal management module.

16 Claims, 12 Drawing Sheets

(51) Int. Cl.

| | |
|---|---|
| ***F16L 41/03*** | (2006.01) |
| ***H01M 10/613*** | (2014.01) |
| ***H01M 10/625*** | (2014.01) |
| ***H01M 10/63*** | (2014.01) |

(52) U.S. Cl.
CPC ....... *H01M 10/613* (2015.04); *H01M 10/625* (2015.04); *H01M 10/63* (2015.04); *H01M 2220/20* (2013.01)

(56) References Cited

FOREIGN PATENT DOCUMENTS

| | | | |
|---|---|---|---|
| DE | 102021102023 | A1 | 8/2022 |
| FR | 2848621 | A1 | 6/2004 |
| FR | 2955148 | A1 | 7/2011 |
| JP | 06185362 | A | 7/1994 |
| WO | 2022065768 | A1 | 3/2022 |

* cited by examiner

THERMAL MANAGEMENT MODULE

CROSS REFERENCE TO RELATED PATENT APPLICATIONS

This is a U.S. national phase patent application of PCT/DE2023/200204 filed Sep. 27, 2023, which claims the benefit of and priority to German Patent Application No. 10 2023 203 863.3 filed on Apr. 26, 2023, the entire contents of each of which are incorporated herein by reference for all purposes.

TECHNICAL FIELD

The present invention relates to the technical field of the thermal management of components of the drivetrain and the high-voltage system of battery electric vehicles (BEV).

Thermal management systems conduct energy from heat sources to heat sinks. Heat sinks are, for example, a radiator in the front end of the vehicle, chillers in the heat pump circuit or, under certain conditions, a high-voltage battery. The general aim is to use energy as efficiently as possible. Thermal management modules for electric vehicles typically comprise a manifold and possibly a reservoir. The invention relates to such a thermal management module.

BACKGROUND

A similar thermal management module that comprises a manifold and a reservoir is known, for example, from U.S. Pat. No. 10,665,908 B2. The reservoir contains the coolant and the manifold comprises pumps, valves and the fluid guide. The reservoirs in the prior art are typically divided horizontally into two main parts and closed with a welded lid as the upper main part. Typical reservoirs in the prior art furthermore have a plurality of chambers for degassing the coolant, which are separated by vertical walls. The reservoirs in the prior art may additionally be mounted and sealed to a manifold containing pumps, valves and a fluid line. In the aforementioned U.S. Pat. No. 10,665,908 B2, the manifold is, for example, integrated into the lower shell of the reservoir. The manifold is usually welded from two or more parts along one or more weld seams.

A thermal management module for electric vehicles according to the aforementioned technical field comprises a manifold and a reservoir. The manifold comprises pumps, valves and a fluid line. The manifold is typically composed of two or more parts. The reservoir contains coolant and a coolant fill level sensor, and is usually divided horizontally and closed at the top with a welded lid.

Problems are caused by the fact that it is difficult to join and seal the manifold and the reservoir, in particular if the parts are made of different materials and therefore have different thermal material behaviours and geometric tolerances. A permanently effective sealing of the parts is difficult due to the relative movement between the parts and the different thermal expansion behaviour during operation. An improved assembly method for joining the manifold and the reservoir is therefore required.

A horizontal weld seam generally allows the reservoir to contain a plurality of vertical chambers to guide the fluid along the path from the inlet or outlet and ensure degassing of the fluid, which is one of the main functions of the reservoir. The vertical chambers can only be produced in one direction with a horizontal weld seam.

Fill level sensors are also used in the reservoir to determine the fill level of the fluid. These fill level sensors typically comprise two pins that are inserted into the reservoir from above and can emerge from the fluid if the reservoir is tilted or fluid is lost, resulting in an error message.

This can be prevented by providing additional fluid volume, but, in the case of fluid loss, this would only delay the loss of fluid. The amount of additional fluid volume required to prevent error messages when the reservoir is tilted increases as the horizontal distance between the two pins of the fill level sensor increases.

Against this background, one aim of the present invention is to solve the aforementioned problems.

This object is solved by a thermal management module as shown and descried herein.

SUMMARY

A thermal management module for electric vehicles is provided according to the present invention, which comprises a reservoir and a manifold. The thermal management module is composed of two half-shells, each comprising a manifold half-shell and a reservoir half-shell as a single piece, the two half-shells being joined together.

The half-shells, which each comprise a reservoir half-shell and a manifold half-shell, are configured to form the thermal management module by assembling and joining them together. The two half-shells do not have to be the same size, but can be of different sizes and shapes, provided that they are of complementary shape such that they can be joined and sealed together to form a thermal management module according to the invention.

The half-shells are preferably made of plastic, more preferred of thermoplastic or thermosetting plastic, and are produced in a moulding process, for example injection moulding. Therefore the half-shells are configured such that they can be demoulded in a single demoulding direction, and thus production can be realised in a simple and cost-effective manner.

The design of the half-shells themselves is advantageous in that the shape facilitates simple and economically advantageous moulding, for example because a single demoulding direction and thus a small number of production steps can be realised. Owing to the integral construction of the two manifold half-shells and reservoir half-shells each as a single piece, the number of components of the thermal management module and thus the complexity and manufacturing costs are reduced. Furthermore, assembly involves fewer work steps and the attachment and sealing between the manifold and the reservoir can be better ensured due to the small number of joints. On the one hand, the low number of components and assembly steps is thus realised and, on the other hand, a fixed, geometrically defined and effectively fluidically sealed connection is formed between the reservoir and the manifold since the number of components and joints is minimised owing to the integral design of the manifold and reservoir half-shells.

The manifold of the thermal management module according to the invention preferably contains at least one pump, one valve and one fluid line. These components are configured to convey cooling fluid and guide it into a cooling fluid circuit of the electric vehicle in order to ensure heat and, if necessary, cooling management for optimal use or dissipation of the heat in the components mentioned above.

The thermal management module is preferably configured such that the two half-shells are joined along a common joining seam that lies in one plane or at least does not comprise any steps. This structural design ensures that the two half-shells can be joined together in a simple and efficient manner. The half-shells can also be manufactured efficiently since, for example, an injection moulding tool has a geometrically simpler design than would be the case with a stepped or free-formed joining seam.

It is furthermore preferred that the thermal management module is configured such that the common joining seam is arranged vertically when the thermal management module is in the installed state.

Owing to the constructions for joining the manifold to the rest of the cooling fluid circuit that are common in the present technical field, the configuration of the manifold and reservoir half-shells as a single piece, in particular with a vertical joining seam, can be realised particularly well. Thermal management modules are often configured in such a manner that the reservoir is arranged at least partially above the manifold when the thermal management module is in the installed state. In contrast to a vertical joining seam, a horizontal joining seam would, in such cases, not allow the manifold half-shells and reservoir half-shells to be configured as a single piece and more parts would be necessary. However, in the case of other configurations of the thermal management system and other arrangements of the further components in the installation space, a horizontal or sloping joining seam is also conceivable.

The vertical extension of the joining seam means that the joining seam has a substantially vertical orientation when the thermal management module is in an installed state in which it is installed in the vehicle. This means that when the thermal management module is in the installed state, the joining seam lies substantially in a plane that is substantially vertical. The joining seam does not have to be strictly vertical, i.e. at an angle of 90° to the horizontal plane. Deviations from this angle, at which the functions and effects described herein can be fulfilled, are also covered by the present invention.

In a preferred embodiment, the two half-shells of the thermal management module are welded together. Friction welding, heated or hot mirror welding or infrared welding, for example, can be used as welding processes. In the case of the advantageous design of the thermal management module according to the invention, in particular due to the configuration with only one joining or welding seam, these joining methods, unlike other joining methods, enable a high level of efficiency during manufacture and do not require any additional components, and thus the total number of parts and assembly steps is kept to a minimum.

For manufacturability of the combined reservoir and manifold parts, it is preferred with regard to the demoulding direction to have a vertical weld seam on both the reservoir and the manifold.

The welding process is simpler with only one welding direction. The manifold and reservoir are manufactured as one part, and thus no additional attachment and sealing between the parts is required.

The reservoir preferably has a substantially spherical shape. This enables a simple moulding and demoulding process and, depending on the arrangement of the other systems and assemblies in the vehicle, optimises the use of installation space. Furthermore, a spherical shape is generally advantageous in terms of fluid flow as compared to, for example, cuboid reservoirs since the fluid cannot accumulate in corners, for example if the thermal management module is tilted, and is fed more efficiently to an outlet. Fill level detection is also more accurate and reliable with a spherical shape of the reservoir and mechanical properties such as strength are generally better.

It is further preferred that the reservoir comprises a reservoir inlet, a reservoir outlet and a plurality of horizontal walls. The horizontal walls are configured to guide a cooling fluid along a meandering path from the reservoir inlet to the reservoir outlet.

One of the main functions of the reservoir is to degas the fluid. In the thermal management module according to the present disclosure, degassing is ensured by a plurality of horizontal, internal walls that force the fluid along a meandering path from the inlet to the outlet of the reservoir. Owing to the meandering guidance of the path along which the cooling fluid flows from the reservoir inlet to the reservoir outlet, the distance travelled by the cooling fluid is increased, thus improving the effectiveness of the degassing of the cooling fluid.

Just like the reservoir itself, the horizontal walls of the reservoir are divided in the non-assembled state. Each horizontal wall comprises a first part in the first half-shell and a second part in the second half-shell. Owing to the complementary arrangement of these structures in the two half-shells, the horizontal walls are only finally formed once the reservoir is assembled. Each horizontal wall can be continuous by arranging the first part in contact with the second part. In this case, the first and second part of each horizontal wall can be welded together along the contact surface. Such a configuration improves the mechanical properties and in particular the strength of the entire reservoir. Alternatively, the first part and second part of each horizontal wall may also have a distance of preferably less than 3 millimetres from one another, which would be advantageous in terms of effective degassing.

The plurality of horizontal walls is preferably arranged such that each horizontal wall is inclined at an angle relative to a horizontal plane, sloping down towards the centre of the reservoir. The angle of the horizontal walls relative to the horizontal plane is acute and preferably less than 50°, more preferred less than 30°. The inclination of the horizontal walls towards the centre of the reservoir supports the proper flow of the cooling fluid, even if the entire thermal management module is tilted slightly. However, for the sake of clarity and comprehensibility and in order to delimit them from the vertically arranged walls of the prior art, the walls will be referred to as horizontal walls in the following.

In a preferred embodiment, at least one horizontal wall comprises a drainage opening that is configured to allow air to escape from an area underneath the horizontal wall to an area above the horizontal wall.

In the case of horizontal walls inclined towards the centre of the reservoir as described above, it is to be expected that air will accumulate underneath the horizontal walls during the degassing process of the cooling fluid. This air can escape into an upper area of the reservoir through the drainage opening that is located at the highest point of the horizontal wall in the region where the horizontal wall transitions to the reservoir body. This improves the effectiveness of degassing and reduces the risk of air being sucked into the manifold.

The reservoir comprises, independently of the features mentioned above and below, but arbitrarily combinable therewith, a fluid fill level sensor comprising two fluid fill level sensor pins. The fluid fill level sensor is configured to detect whether the fluid fill level is below a predetermined minimum fluid fill level. The pins of the fluid fill level sensors are covered and insulated in such a manner that only the tips of the pins are exposed and electrically conductive. The exposed tips of the pins are preferably less than 5 mm long, more preferred less than 3 mm long. Only the position of the tips of the pins is thus relevant for detecting the cooling fluid fill level. In order to keep the required fluid fill level as low as possible, the fluid fill level sensor pins are arranged substantially vertically one above the other and project substantially horizontally from at least one of the half-shells in the direction of the centre of the reservoir. The tip of the lower of the two fill level sensor pins can then be flooded at any time and the tip of the upper of the two fill level sensor pins can be flooded if the fluid fill level is above a minimum fill level. The distance between the pins along the two horizontal axes may be virtually zero such that no additional coolant is required to keep the tips of the two pins flooded under all tilting conditions of the reservoir. This ensures reliable fill level detection even if the thermal management module is tilted.

BRIEF DESCRIPTION OF THE FIGURES

Preferred embodiment examples of the invention will be explained in more detail below with reference to the drawings.

EMBODIMENTS OF THE INVENTION

Figure 1A:
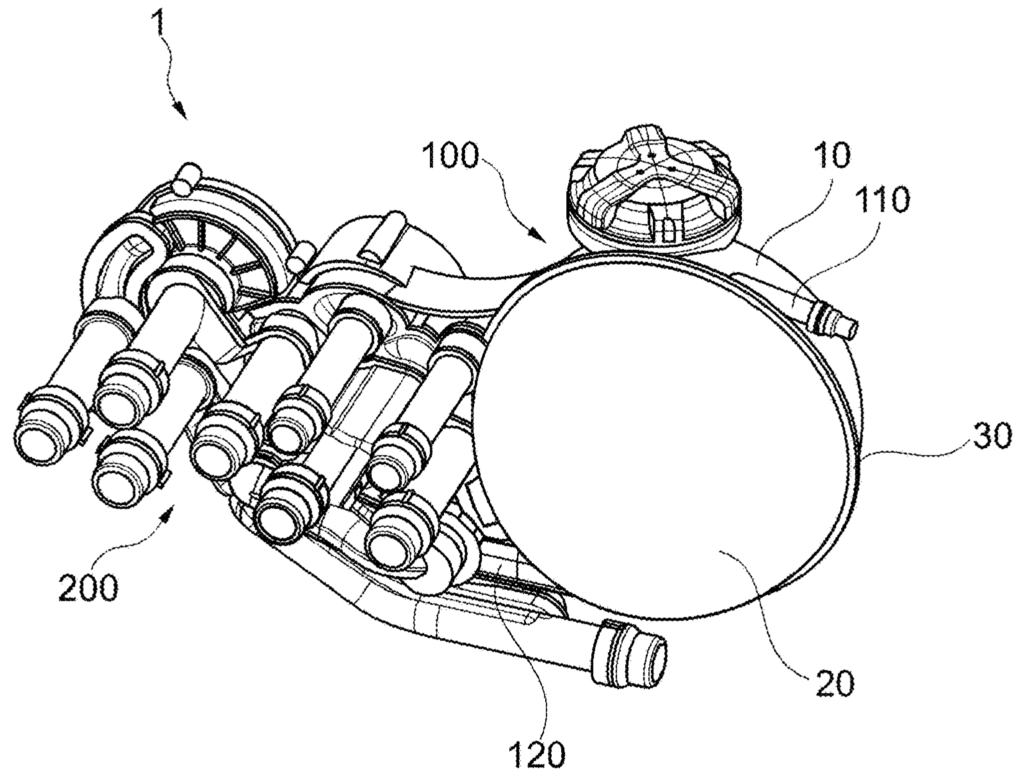
FIG. 1A shows a perspective view of a preferred embodiment of a thermal management module.

FIG. 1A shows a perspective view of a preferred embodiment of a thermal management module 1. As is apparent in FIG. 1A, a first half-shell 10 is joined to the second half-shell 20 along the joining seam 30. The joining seam runs vertically. The joined half-shells 10, 20 together form the reservoir 100, which is substantially spherical in the shown embodiment, and the manifold 200. The manifold 200 is configured to receive the cooling fluid 300 from different areas of a cooling fluid circuit. A partial volume of the cooling fluid 300 is stored in the reservoir 100 and can be fed into the manifold 200, for example to compensate for and control dynamic effects. The manifold 200 is furthermore configured to convey the cooling fluid 300 and return it to different areas of the cooling circuit depending on the operating point. For this purpose, it comprises a plurality of ports that serve as inlets or outlets and via which cooling fluid 300 can be supplied to various components, such as the radiator, the battery or drivetrain components, depending on requirements and the operating point, in order to ensure optimal use or dissipation of heat. For this purpose, the manifold 200 comprises one or more pumps and at least one valve. The cooling fluid 300 is fed from the remaining cooling fluid circuit, which is not shown, to the reservoir 100 via the reservoir inlet 110 and from the reservoir 100 to the manifold 200 via the reservoir outlet 120. The reservoir 100 comprises a refill port, which is closed by a lid and via which cooling fluid 300 can be added to the cooling fluid circuit.

Figure 1B:
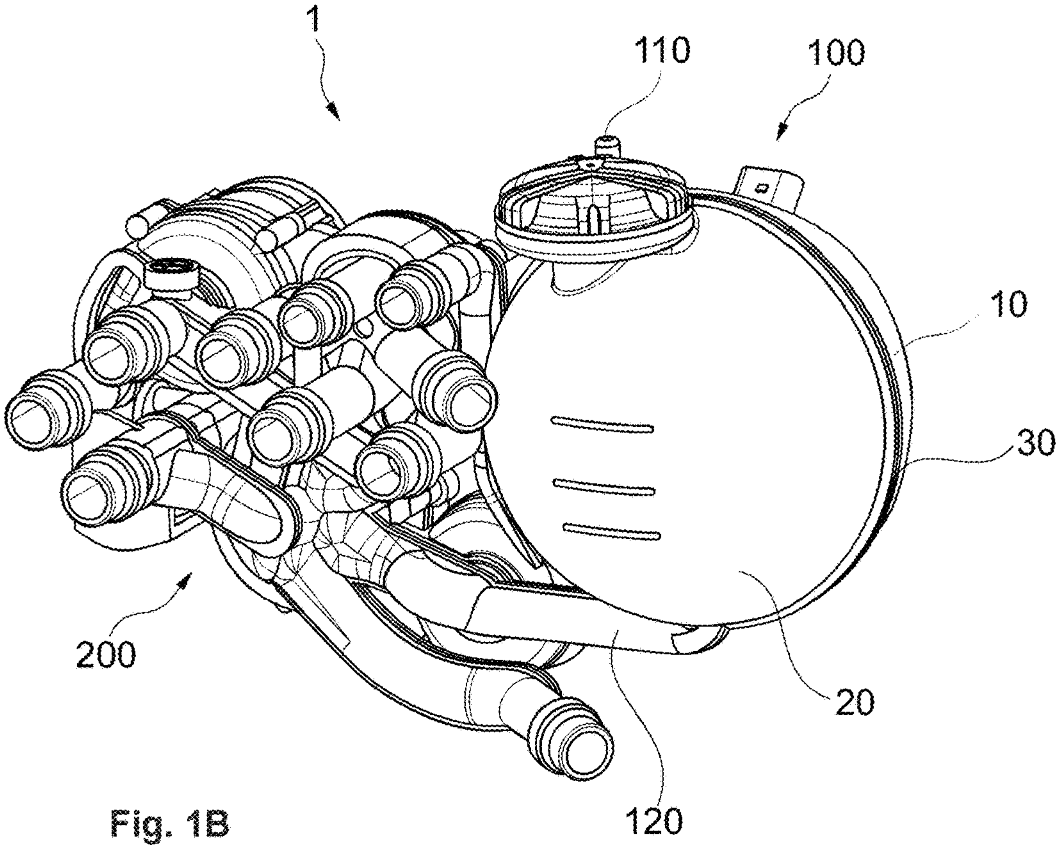
FIG. 1B shows a perspective view of a further preferred embodiment of a thermal management module.

FIG. 1B shows another embodiment of the thermal management module 1 of FIG. 1A. The shown embodiment only differs from the embodiment shown in FIG. 1A by means of minor structural modifications. FIG. 1B shows a slightly modified arrangement of the cooling fluid inlets and outlets. In particular, the reservoir inlet 110 is arranged adjacent to the refill port in a vertical orientation.

Figure 2:
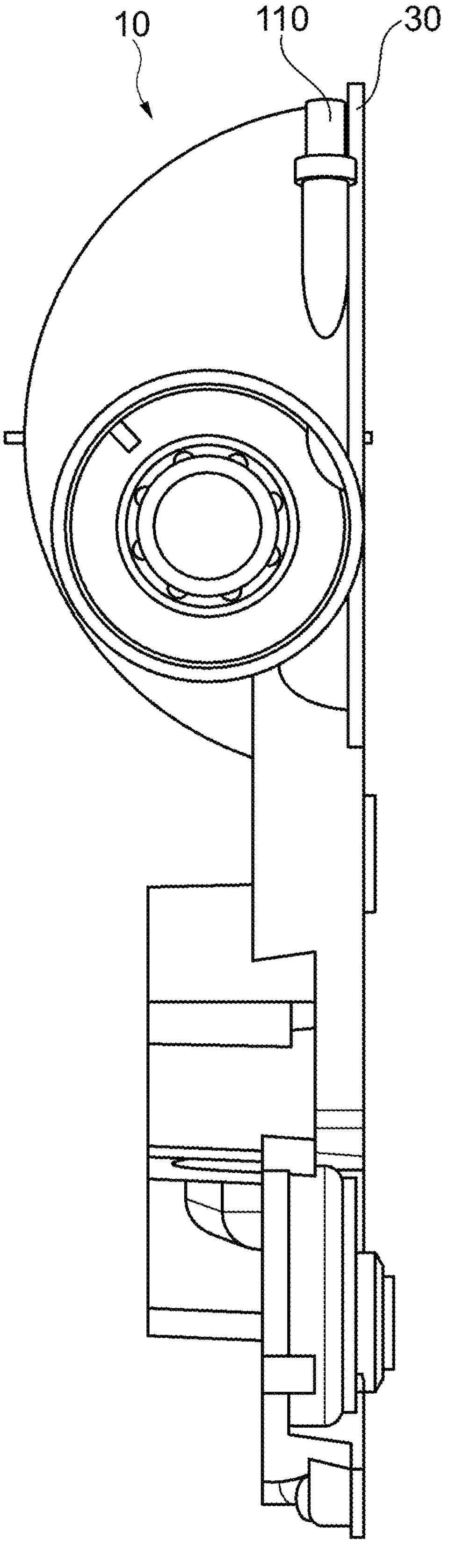
FIG. 2 shows a top view of an embodiment of a first half-shell of the thermal management module.

FIG. 2 shows a top view of an embodiment of a first half-shell 10 of the thermal management module 1 in a front view. The joining seam 30 is substantially in one plane. The first half-shells of the reservoir 100 and the manifold 200 are integrally configured as one piece and are joined together.

Figure 3:
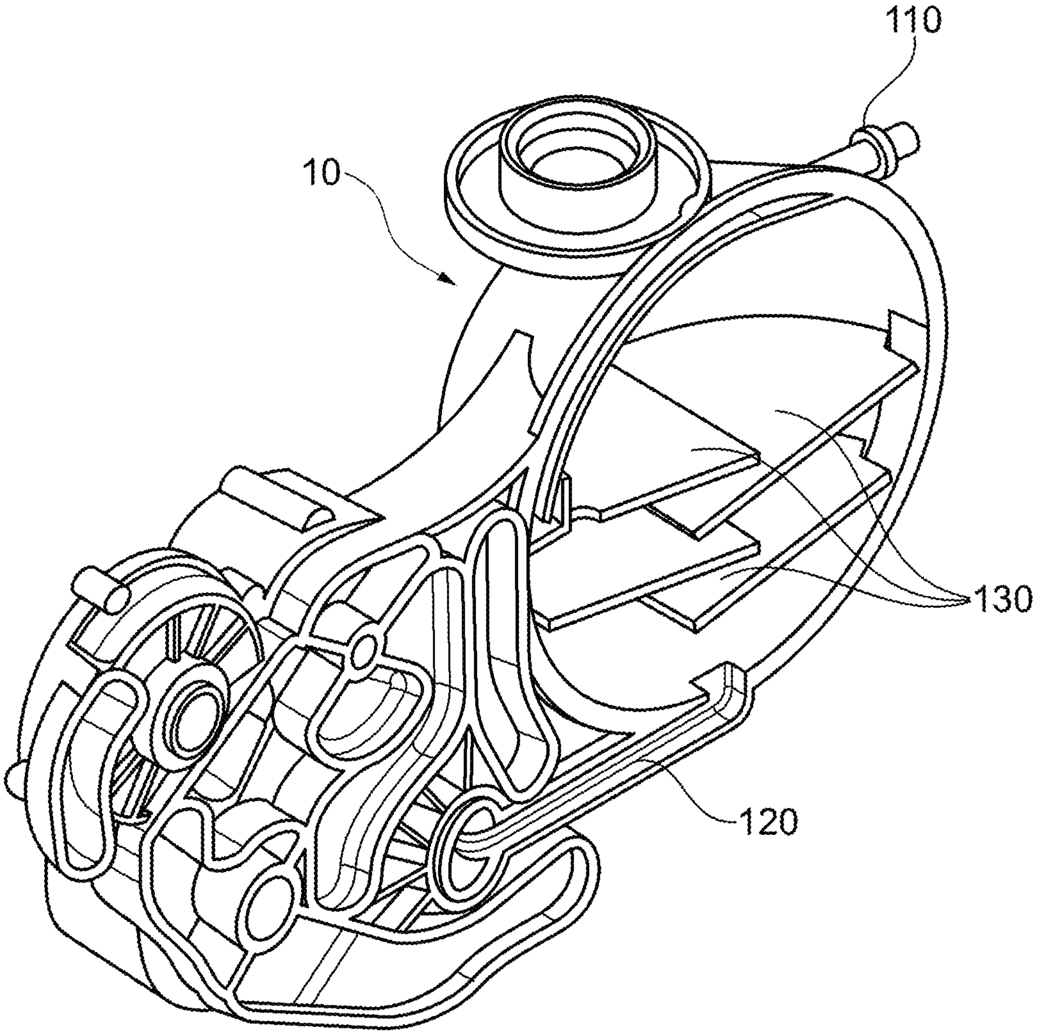
FIG. 3 shows a perspective view of the embodiment according to FIG. 2 of a first half-shell of the thermal management module.

FIG. 3 shows a perspective view of the embodiment according to FIG. 2 of a first half-shell 10 of the thermal management module 1. In this figure, the lid of the refill port of the reservoir 100 has been removed. The first half-shell of the reservoir 100 has the reservoir inlet 110 and comprises internal, horizontal walls 130 that are not aligned strictly horizontally but are slightly inclined towards the centre of the reservoir 100. The first half-shell of the manifold 200 comprises a plurality of fluid lines formed by a plurality of line walls.

In the region of the joining seam 30, the first half-shell 10 is formed such that it is complementary to the second half-shell 20. The cavities that are open towards the joining seam 30, such as the horizontal chambers of the reservoir 100, the reservoir outlet 120 or the fluid lines of the manifold 200, are thus only fully and functionally formed when the first half-shell 10 is joined to the second half-shell 20.

Figure 4:
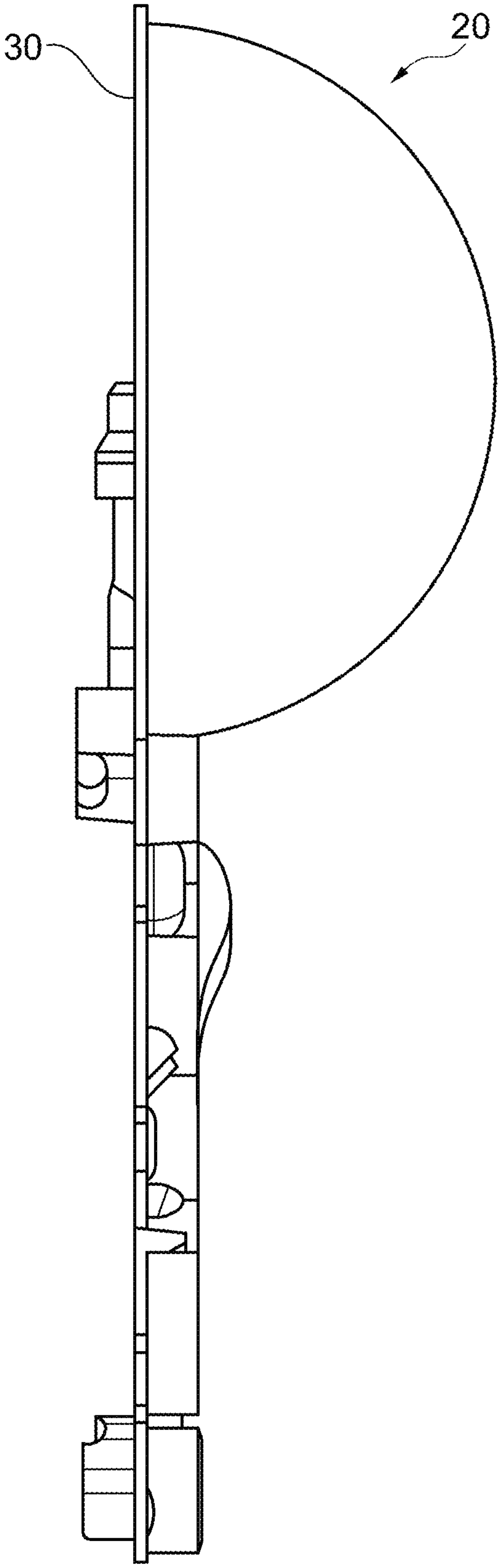
FIG. 4 shows a top view of an embodiment of a second half-shell of the thermal management module.
Figure 5:
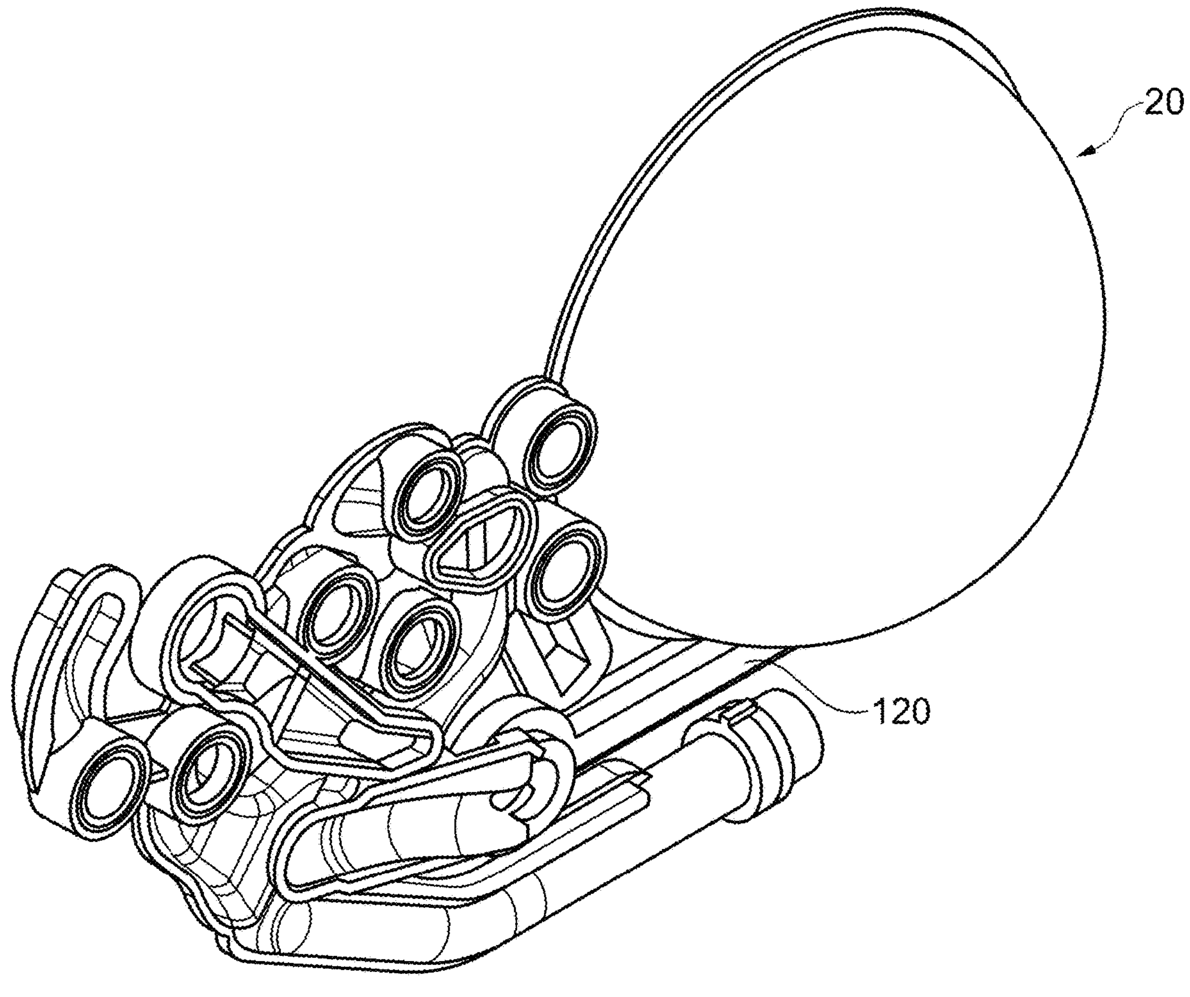
FIG. 5 shows a perspective view of the embodiment according to FIG. 4 of a second half-shell of the thermal management module.

FIGS. 4 and 5 show embodiments of a second half-shell 20 of the thermal management module 1 in different views.

In the region of the joining seam 30, the second half-shell 20 is formed such that it is complementary to the first half-shell 10. The cavities that are open towards the joining seam 30 are only fully and functionally formed when the first half-shell 10 is joined to the second half-shell 20.

Figure 6:
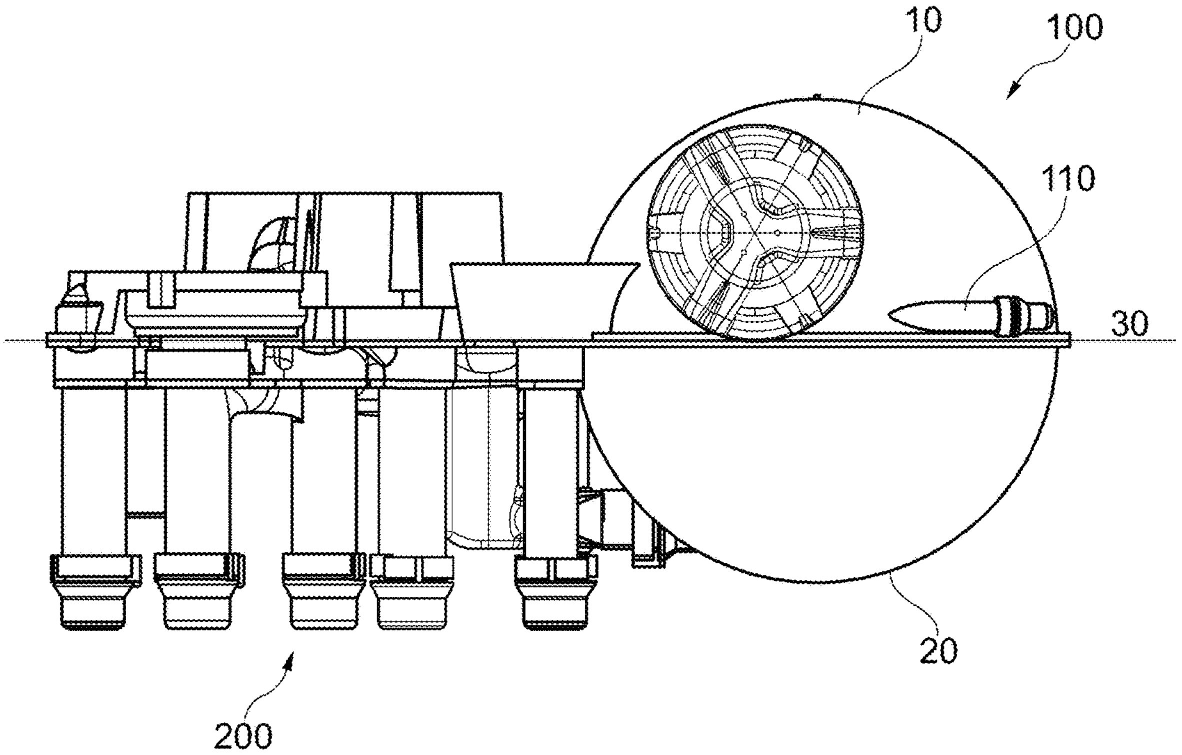
FIG. 6 shows a top view of the embodiment of FIG. 1A.

FIG. 6 shows a top view of the embodiment of FIG. 1A. The thermal management module 1 is formed by joining the first half-shell 10 and the second half-shell 20.

Figure 7:
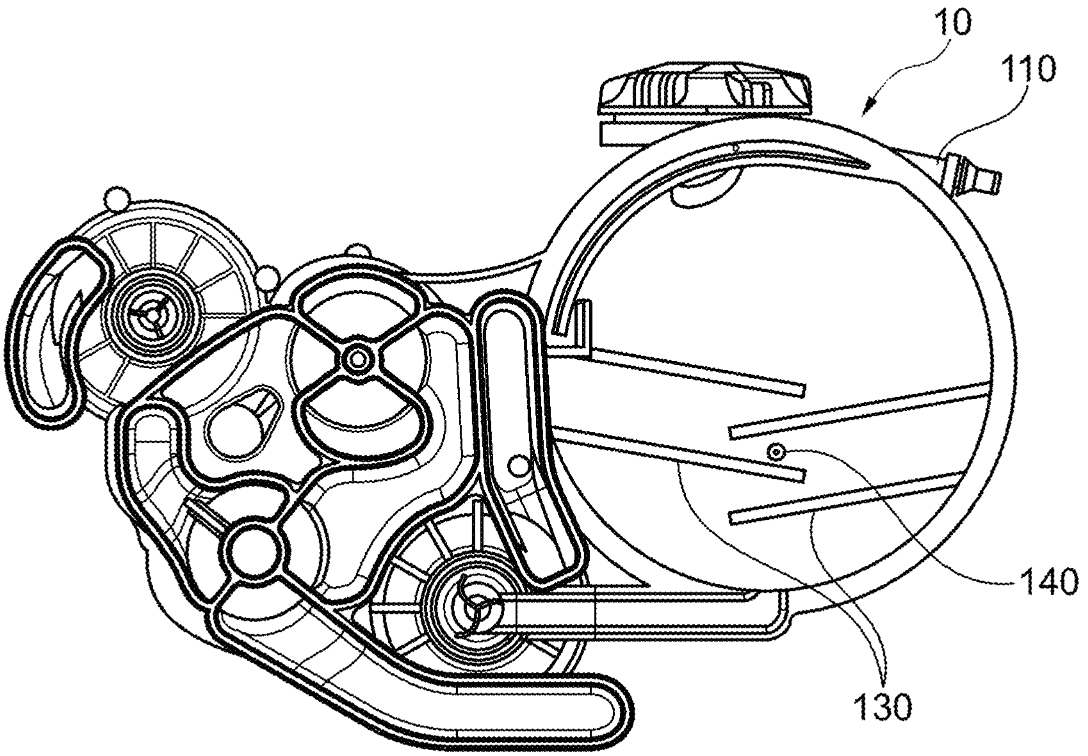
FIG. 7 shows a side view of the embodiment of the first half-shell of FIGS. 2 and 3.
Figure 8:
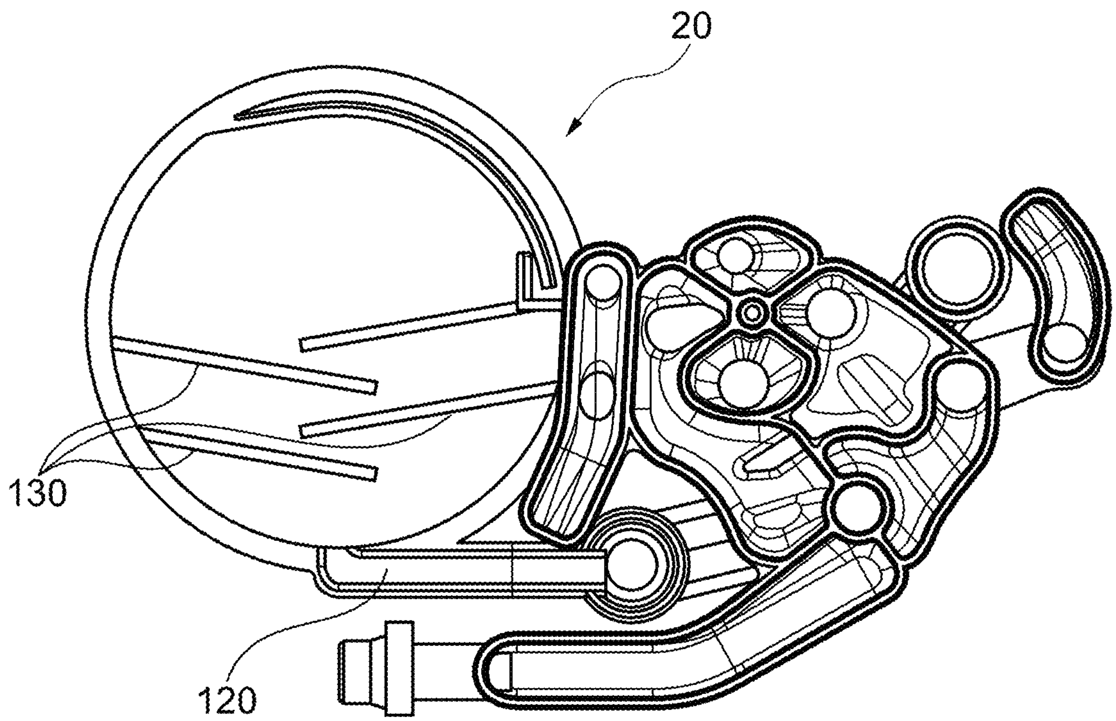
FIG. 8 shows a side view of the embodiment of the second half-shell of FIGS. 4 and 5.

FIGS. 7 and 8 show side views of the embodiments according to FIGS. 2 and 3 of the first half-shell 10 and according to FIGS. 4 and 5 of the second half-shell 20. The joining seam 30 and all internal structures of the two half-shells 10, 20 are configured in such a manner that when the two half-shells 10, 20 are joined together, they fully and functionally form the thermal management module 1 and all internal structures, such as the horizontal chambers of the reservoir 100, the reservoir outlet 120 or the fluid lines of the manifold 200.

Figure 9:
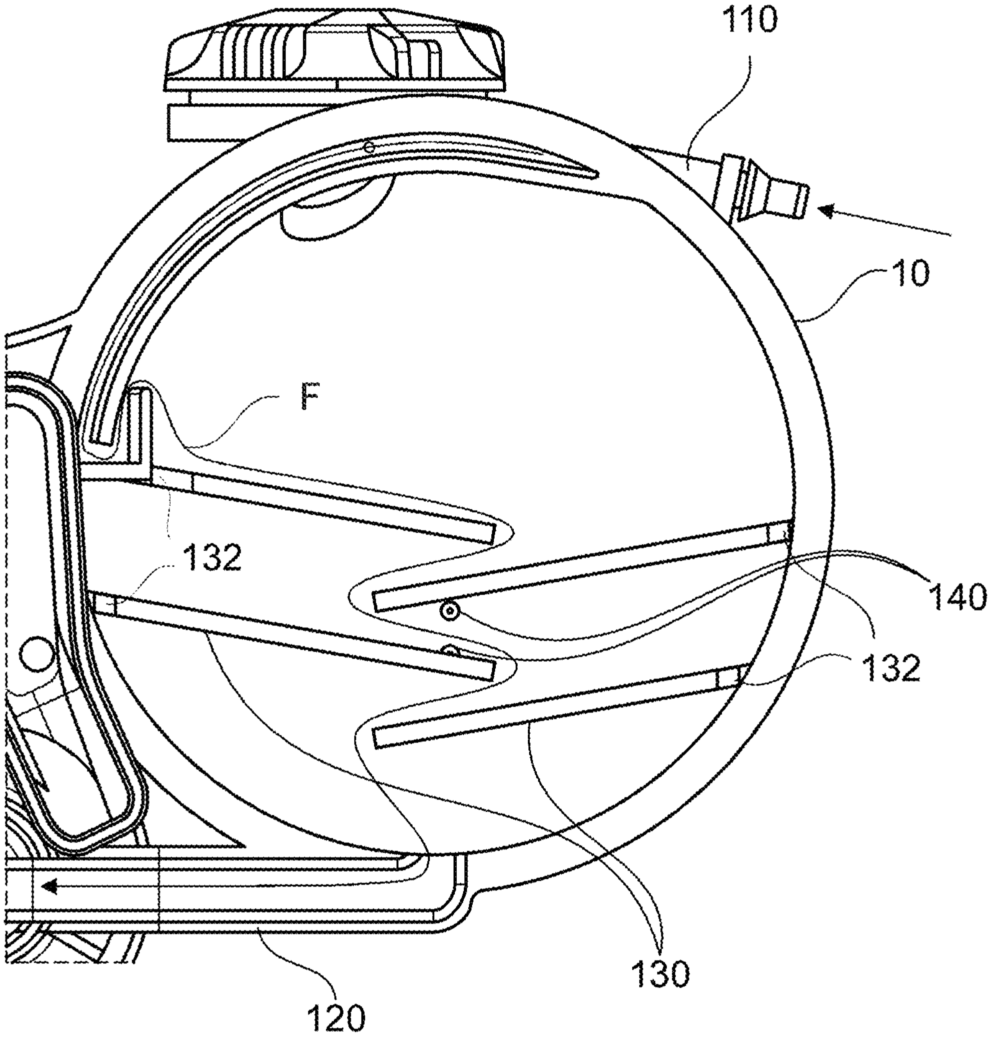
FIG. 9 shows a fluid flow within a reservoir of the embodiment shown in FIG. 7.

FIG. 9 shows the fluid flow F within a reservoir 100 of the embodiment shown in FIG. 7. A partial volume of the cooling fluid is supplied via the reservoir inlet 110 and fed into the interior of the reservoir 100. It subsequently arrives at a first horizontal wall 130 and is guided via said wall to the horizontal wall 130 therebelow. The cooling fluid then follows the meandering path created by the horizontal walls 130 to the reservoir outlet 120, through which it is guided to the manifold 200.

FIG. 9 furthermore shows the fluid fill level sensor pins 140. The tips of the pins 140 are spaced apart in the vertical direction and are substantially arranged such that the two horizontal axes are precisely one above the other. The electrically conductive tips of the pins 140 are arranged on the vertical central axis in order to minimise the influence of tilting of the thermal management module 1 on the required cooling fluid volume in the reservoir 100.

Figure 10:
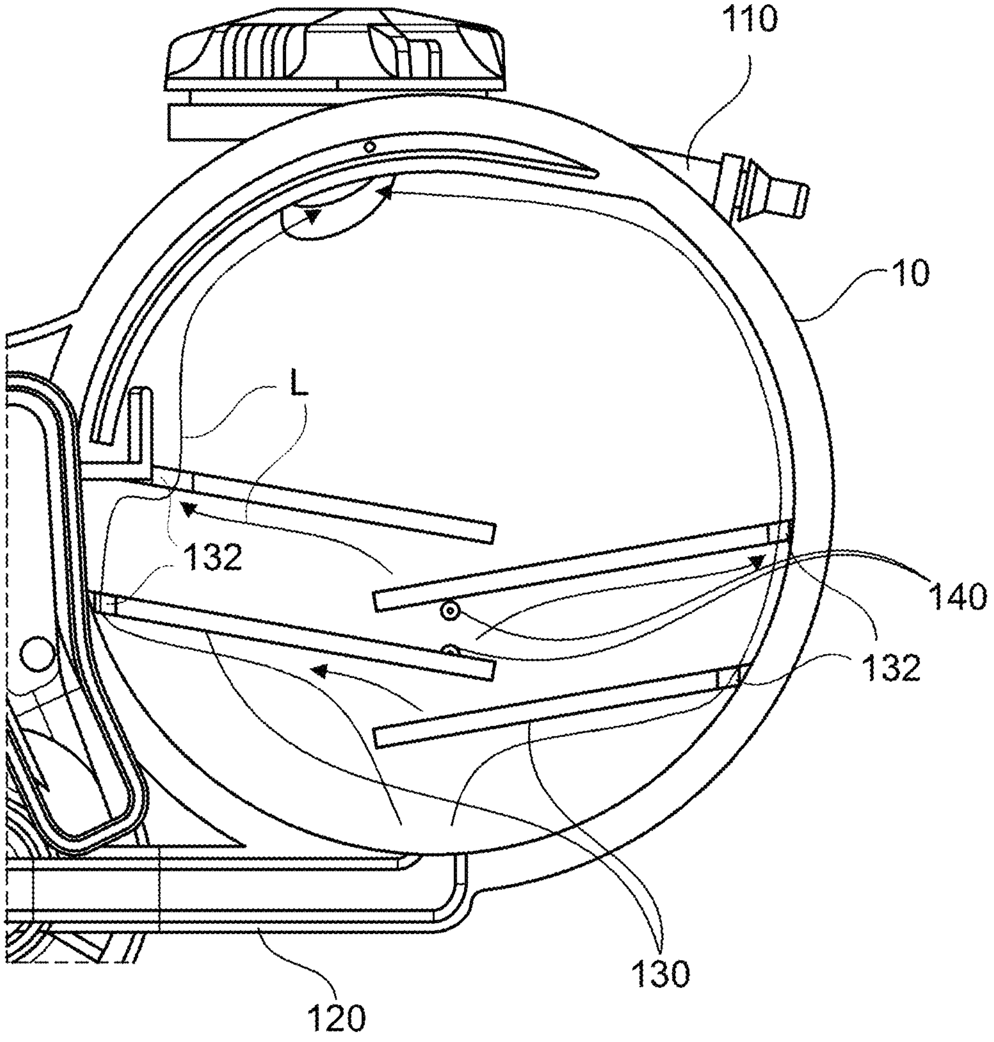
FIG. 10 shows the reservoir of FIG. 9 and an airflow inside the reservoir.

FIG. 10 shows the reservoir 100 of FIG. 9 and an airflow L inside the reservoir 100. The airflow L follows a path, via which air or gas released by the degassing of the cooling fluid 300 is guided from a lower area into an upper area of the reservoir 100. This is basically in the opposite direction to the path taken by the cooling fluid 300. Through drainage openings 132 provided for this purpose at the highest points of the horizontal walls 130, the air or gas can flow past the cooling fluid 300 and escape into an upper area of the reservoir 100.

Figure 11:
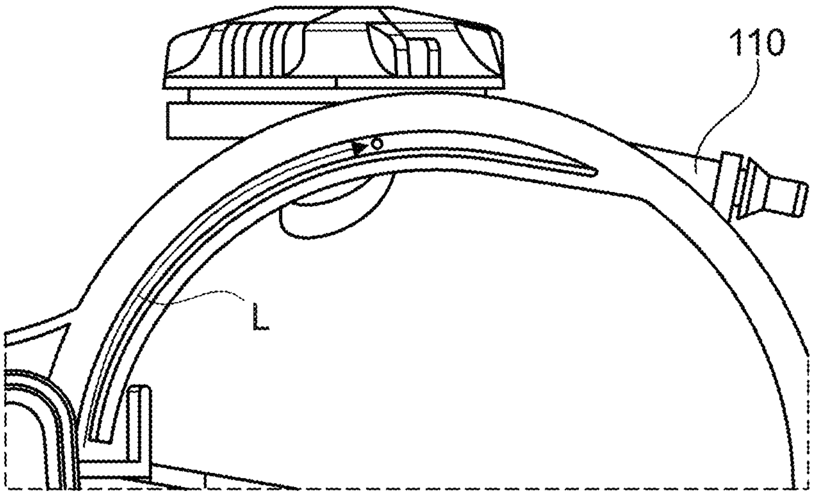
FIG. 11 shows an enlarged partial view of the reservoir of FIG. 10.

FIG. 11 is an enlarged partial view of the reservoir 100 of FIG. 10 and shows part of the airflow L and the air channel in the reservoir inlet 110. Air that accumulates in the air channel in the reservoir inlet 110 can thus escape into an area of the refill port of the reservoir 100 and does not hinder cooling fluid 300 from entering through the reservoir inlet 110.

Figure 12:
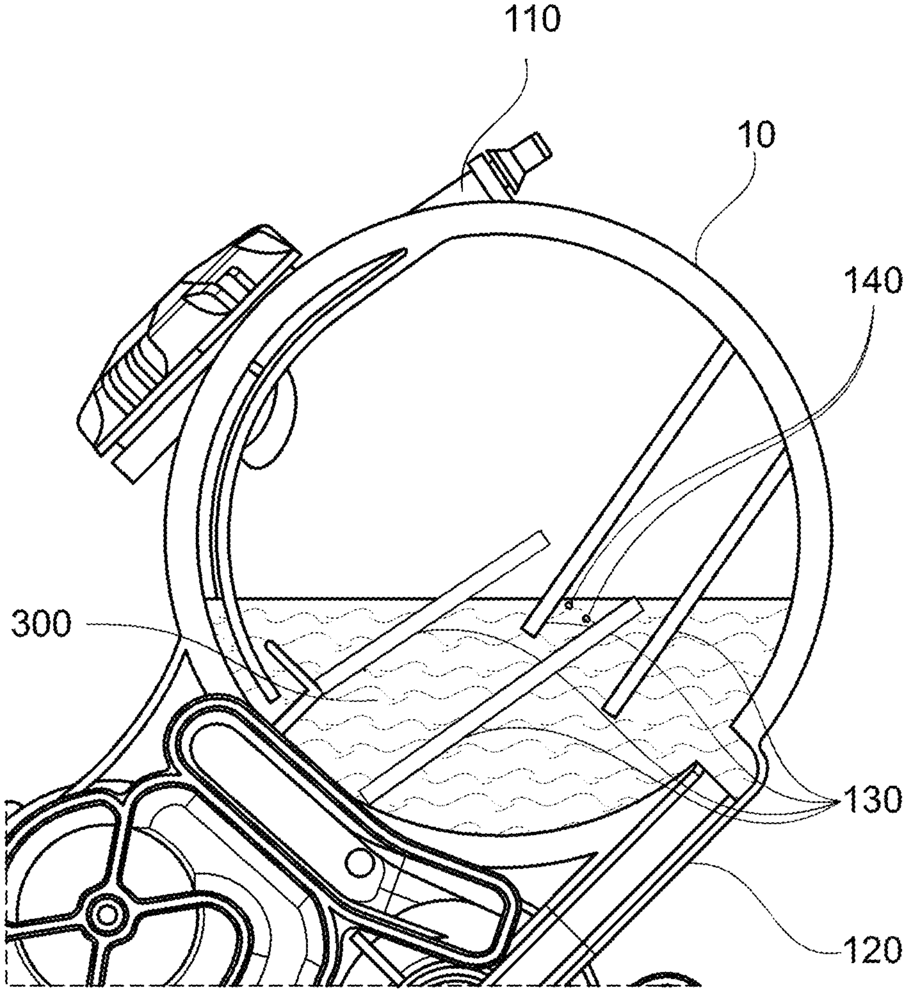
FIG. 12 shows the embodiment of FIGS. 2, 3 and 7, in which the reservoir is tilted, guides a cooling fluid and comprises sensor pins of a fluid fill level sensor.

FIG. 12 shows the embodiment of FIGS. 2, 3 and 7, in which the reservoir is tilted, guides a cooling fluid and comprises the sensor pins of the fluid fill level sensor. Owing to the arrangement of the tips of the sensor pins vertically one above the other and the central arrangement of the tip of the upper sensor pin, both tips remain flooded even if the fluid level is more greatly inclined.

LIST OF REFERENCE NUMBERS

1 Thermal management module
10, 20 Half-shells
30 Joining seam
100 Reservoir
110 Reservoir inlet
120 Reservoir outlet
130 Horizontal wall
132 Drainage opening
140 Fluid fill level sensor pin
200 Manifold
300 Cooling fluid
F Fluid flow
L Airflow

The invention claimed is:

1. A thermal management module for electric vehicles, comprising:
- a reservoir comprising a reservoir inlet and a reservoir outlet; and
- a manifold comprising a plurality of ports to supply a cooling fluid within the reservoir to external devices, wherein the thermal management module is composed of two half-shells, each further comprising a manifold half-shell and a reservoir half-shell as a single piece, the two half-shells being joined together, and wherein the reservoir outlet supplies the cooling fluid within the reservoir to the manifold.

2. The thermal management module according to claim 1, wherein the two half-shells are joined along a common joining seam arranged in one plane.

3. The thermal management module according to claim 2, wherein the joining seam is arranged vertically in an installed state of the thermal management module.

4. The thermal management module according to claim 3, wherein the two half-shells are welded together along the joining seam.

5. The thermal management module according to claim 2, wherein the reservoir and the manifold are fully and functionally formed when the two half- shells are joined.

6. The thermal management module according to claim 1, wherein the reservoir has a substantially spherical shape.

7. The thermal management module according to claim 1, wherein the reservoir further comprises a reservoir inlet, a reservoir outlet and a plurality of horizontal walls configured to guide the cooling fluid along a meandering path from the reservoir inlet to the reservoir outlet.

8. The thermal management module according to claim 7, wherein at least a partial volume of the cooling fluid is stored in the reservoir and fed into the manifold to compensate for and control dynamic effects.

9. The thermal management module according to claim 1, wherein the plurality of ports includes a refill port closed by a lid and via which the cooling fluid can be added to a cooling fluid circuit.

10. The thermal management module according to claim 9, wherein the reservoir inlet is arranged adjacent to the refill port in a vertical orientation.

11. The thermal management module according to claim 9, wherein the reservoir inlet is arranged adjacent to the refill port in a horizontal orientation.

12. The thermal management module according to claim 1, wherein the manifold is configured to convey the cooling fluid and return the cooling fluid to different areas of a cooling circuit depending on an operating condition.

13. A thermal management module for electric vehicles, comprising:
- a reservoir; and
- a manifold, wherein the thermal management module is composed of two half-shells. each further comprising a manifold half-shell and a reservoir half-shell as a single piece, the two half-shells being joined together, wherein the reservoir further comprises a reservoir inlet, a reservoir outlet and a plurality of horizontal walls configured to guide a cooling fluid along a meandering path from the reservoir inlet to the reservoir outlet, wherein the plurality of horizontal walls is arranged such that each of the plurality of horizontal walls is inclined at an angle relative to a horizontal plane, sloping down towards a center of the reservoir.

14. The thermal management module according to claim 13, wherein at least one of the plurality of horizontal walls further comprises a drainage opening configured to allow air to escape from an area underneath the at least one of the plurality of horizontal walls to an area above the at least one of the plurality of horizontal walls.

15. The thermal management module according to claim 13, wherein the plurality of walls is alternatingly arranged to cause the meandering path from the reservoir inlet to the reservoir outlet.

16. A thermal management module for electric vehicles, comprising:
- a reservoir; and
- a manifold, wherein the thermal management module is composed of two half-shells, each further comprising a manifold half-shell and a reservoir half-shell as a single piece, the two half-shells being joined together, wherein the reservoir further comprises two fluid fill level sensor pins configured to detect whether a fluid fill level is below a predetermined minimum fluid fill level, and wherein the two fluid fill level sensor pins are arranged substantially vertically one above another and project horizontally from at least one of the two half-shells in a direction of a center of the reservoir.

* * * * *